United States Statutory Invention Registration [19]

[11] Reg. Number: H495

Peiffer et al. [43] Published: Jul. 5, 1988

[54] DRILLING FLUIDS BASED ON HYDROCARBON SOLUBLE POLYAMPHOLYTES

[75] Inventors: Dennis G. Peiffer, East Brunswick; Robert D. Lundberg, Bridgewater, both of N.J.; Lawrence P. Sedillo, Columbus, Ga.; John C. Newlove, Kingwood, Tex.

[73] Assignee: Exxon Research and Engineering Company, Florham Park, N.J.

[21] Appl. No.: 72,300

[22] Filed: Jul. 13, 1987

Related U.S. Application Data

[63] Continuation-in-part of Ser. No. 404, Jan. 5, 1987, abandoned, which is a continuation of Ser. No. 770,605, Aug. 29, 1985, abandoned, which is a continuation-in-part of Ser. No. 651,879, Sep. 19, 1984, abandoned.

[51] Int. Cl.[4] ..... C09K 7/06
[52] U.S. Cl. ..... 252/8.515; 252/8.511
[58] Field of Search ..... 252/8.511, 8.515; 524/548, 555

[56] References Cited

U.S. PATENT DOCUMENTS

| | | | |
|---|---|---|---|
| 2,650,905 | 9/1953 | Fordyce et al. | 252/8.54 |
| 3,025,234 | 3/1962 | Canterino | 252/8.54 |
| 4,425,455 | 1/1984 | Turner et al. | 252/8.54 |
| 4,425,461 | 1/1984 | Turner et al. | 252/8.51 X |
| 4,425,462 | 1/1984 | Turner et al. | 252/8.51 X |
| 4,447,338 | 5/1984 | Lundberg et al. | 252/8.54 |
| 4,520,158 | 5/1985 | Peiffer et al. | 524/516 X |
| 4,522,960 | 6/1985 | Peiffer et al. | 524/516 X |

*Primary Examiner*—Herbert S. Guynn

[57] ABSTRACT

An oil-based drilling mud which comprises:

(a) a hydrocarbon liquid substantially immiscible in water;

(b) about 1 to about 100 parts by weight of water per 100 parts of the hydrocarbon liquid;

(c) about 2 to about 50 lb/bbl. of at least one emulsifier;

(d) about 0.5 to about 5 lb/bbl. of a wetting agent;

(e) about 50 to about 750 lb/bbl. of a weighting agent;

(f) about 0.1 to about 25 lb/bbl. of a water insoluble, oil soluble terpolymer, said terpolymer having the formula:

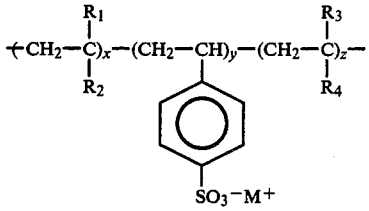

wherein $R_1$ and $R_3$ are selected from the group consisting of hydrogen and a methyl group, wherein $R_2$ is selected from the group consisting of $C_3H_5$, $C_6H_4$—$CH_3$, $C_6H_4(CH_3)_2$ and $CnH_{2n+1}$, wherein n=1 to 30 and $R_4$ is selected from the group consisting of $C_5H_4N$, $CnH_{2n}NH_3$ and $CnH_{2n}N(CH_3)_3$, wherein n=1 to 30 and x is about 40 to about 98 mole percent, y is about 1 to about 50 mole percent, and z is about 1 to about 50 mole percent, wherein y and z are less than 60 mole percent, and M is an amine or a metal cation selected from the group consisting of aluminum, iron, lead, Groups IA, IIA, IVA, VIA, VIIA, VIIIA, IB and IIB of the Periodic Table of Elements.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DRILLING FLUIDS BASED ON HYDROCARBON SOLUBLE POLYAMPHOLYTES

This application is a continuation-in-part of Ser. No. 000,404, filed Jan. 5, 1987, which was a continuation of Ser. No. 770,605, filed Aug. 29, 1985, which was a continuation-in-part of Ser. No. 651,879, filed Sept. 19, 1984, all now abandoned.

FIELD OF THE INVENTION

The present invention relates to polyampholates which function as viscosification agents when added to oil-based drilling muds which are the fluids used to maintain pressure, cool drill bits and lift cuttings from the holes in the drilling operation for oil and gas wells. The polyampholytes have amine groups and sulfonate groups affixed to the polymeric chain, wherein the sulfonated groups are neutralized with a metallic cation or an amine or ammonium counterion. A polar cosolvent can optionally be added to the mixture of oil drilling mud and polyampholytes, wherein the polar cosolvent modifies the rheology by increasing the solubility of the polyampholyte in the oil drilling mud by decreasing the strong ionic interactions between the sulfonate groups and amine groups of the polyampholyte.

The drilling muds formed form these polyampholytes exhibit improved low and high temperature rheological properties as compared to previously disclosed drilling muds formed from powders of sulfonate thermoplastic polymers.

BACKGROUND OF THE INVENTION

In the field of drilling in the exploration for oil and gas, an important component is that of the formulation of drilling muds. Drilling muds are the fluids which are used to maintain pressure, cool drill bits, and lift cuttings from the holes and vary in composition over a wide spectrum. Generally, drilling muds are based on aqueous formulations or oil-based formulations.

A conventional oil-based drilling mud formulation is comprised of basically the following ingredients: oil (generally No. 2 diesel fuel), emulsifying agents (alkaline soaps and fatty acids), wetting agents (dodecyl-benzene sulfonate), water, barite or barium sulfate, (weighting agent), asbestos (employed as viscosification agent) and/or, amine-treated clays (also as viscosification agent).

The above combination of ingredients is generally formulated to possess various weights based primarily on amount of barite added. For example, a typical drilling mud can vary in specific gravity from a range of about 7 pounds per gallon up to 17 pounds per gallon or even greater. This variation in specific gravity is primarily controlled by the amount of barite added. The above formulations perform adequately in a number of applications, primarily those where the use of oil-based drilling muds is dictated by the lack of stability of the formation i which drilling is taking place. For example, in various types of shale formation, the use of conventional water-based muds can result in a deterioration and collapse of the shale formation. The use of the oil-based formulations circumvents this problem. However, it is observed that the current oil-based drilling muds have some significant disadvantages. One disadvantage is that the incorporation of asbestos or asbestos fines can incur significant health problems both during the mud formulation and potentially during the subsequent use of such formulations. Therefore, it is desirable to eliminate the use of asbestos completely in such drilling muds. On the other hand, the use of substitutes for asbestos in this application has; heretofore, not been particularly successful in that the resulting viscosification agents must maintain adequate viscosities under the drilling conditions which can involve high temperature and high shear conditions.

There has been a substantial need for a drilling fluid which would exhibit good performance at high temperature in water sensitive formations. Past experience has shown that oil-based drilling fluids can provide good performance in water sensitive formations, and the state of the art systems can perform well up to about 350° F. Typically, in such formations, the failure viscosities in current muds is circumvented by the addition of more viscosifier during the circulation of the drilling mud. While this solution is adequate at moderate temperatures, when much higher temperatures are encountered (example: geothermal wells or natural gas wells), the degradation of the viscosifier can be so rapid that the additional costs for a viscosifier can be uneconomical. There is a need, therefore, for drilling fluids which can maintain their viscosity and gel strength at temperatures up to and exceeding 400° F. These needs are not adequately met by the current drilling fluids, even with the oilbased drilling muds often employed.

This invention describes an approach to viscosification of oil-based drilling muds which permits the substitution or co-usage of polyampholytes with asbestos fines and amine clays. The resulting polymer-modified drilling muds display improved low temperature rheological properties which include improved gel strength at up to temperatures of 400° F. and higher, based on tests conducted for 16 hours at such temperatures.

The types of polyampholytes that are envisioned in the present invention include water insoluble oil soluble terpolymers of styrene, styrene homologs or other hydrocarbon soluble monomers neutralized styrene sulfonate and vinyl pyridine. These polyampholytes possess suitable solubilities in the drilling mud environment.

It has also been shown that sulfonated EPDM is very effective as a viscosifier for oil-based drilling muds, as described in U.S Pat. No. 4,447,338. We have found that sulfonated EPDM provides good viscosification at temperatures of about 300° F. and below when formulated in a mud based on fresh water.

Quite unexpectedly, the use of the polyampholytes of the instant invention in forming the drilling mud results in a drilling mud having improved low and high temperature rheological properties.

The instant invention will describe materials that provide improved, excellent gel strength at low and high temperatures and may be effective to even higher temperatures.

A second facet of the instant invention relates to the use of these materials in formulations which employ high concentrations of salt in the aqueous phase. The polyampholytes which are the preferred embodiment of this invention, lose some of their efficacy in salt water. It has been found that the combination of a suitable non-ionic emulsifier with the polyampholyte gives formulations which are effective with salt water. Therefore, these systems give formulations which perform well at low and high temperatures and in the presence of salt water phases, which is a highly desired objective in the drilling fluids industry.

SUMMARY OF THE INVENTION

The present invention relates to polyampholytes which function as viscosification agents when added to oil-based drilling muds which are the fluids used to maintain pressure, cool drill bits and lift cuttings from the holes in the drilling operation for oil and gas wells. The polyampholytes have amine groups and sulfonate groups affixed to the polymeric chain, wherein the sulfonated groups are neutralized with a metallic cation or an amine or ammonium counterion. A polar cosolvent can optionally be added to the mixture of oil drilling mud and polyampholytes, wherein the polar cosolvent modifies the rheology by increasing the solubility of the polyampholyte in the oil drilling mud by decreasing the strong ionic interactions between the sulfonate groups and amine groups of the polyampholyte.

GENERAL DESCRIPTION OF THE INVENTION

The present invention describes a new class of viscosification agents for oil-based drilling muds which are used during operation of gas and oil wells, wherein these viscosification agents are polyampholytes thermoplastic polymers. The oil-based drilling muds of the instant invention minimally comprise, but can also include other additives; an organic liquid such as an oil, fresh water or salt water, an emulsifier, a wetting agent, a weighting material and the polyampholyte. In general, the oil-based drilling mud has a specific gravity of about 7 pounds per gallon to about 20 pounds per gallon, more preferably about 10 to about 16, and most preferably about 12 to about 16. A typical oil-based drilling mud, as envisioned by the instant invention, comprises: an oil; about 1 to about 10 parts by weight of water per 100 parts by weight of the oil, more preferably about 3 to about 5; and 2 to about 50 lb/bbl. of at least one emulsifier; about ½ to about 5 lb/bbl. of a wetting agent; and sufficient weighting material (barium sulfate or barite) necessary to give the desired mud density which comprises less than about 800 lb/bbl. of barium sulfate, more preferably about 5 to about 750, and most preferably about 10 to about 700; and about 0.1 to about 25 lb/bbl. of a polyampholyte.

The polyampholytes of the instant invention are terpolymers of a nonionic monomer, a sulfonate containing monomer and an amine containing monomer. The terpolymers of the instant invention are formed by a free radical emulsion polymerization of the amine containing monomer and the nonionic monomer to form a copolymer of the nonionic monomer and the amine containing monomer. This copolymer is subsequently sulfonated according to the procedures of U.S. Pat. No. 3,836,511, which is hereby incorporated by reference, to form the terpolymer of the nonionic monomer, the sulfonate containing monomer and the amine containing monomer.

A suitable oil soluble and water insoluble terpolymer of the instant invention is of the general formula:

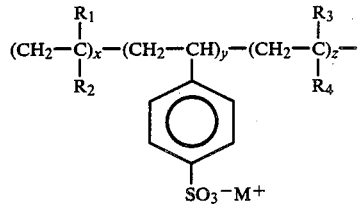

wherein $R_1$ and $R_3$ are selected from the group consisting of hydrogen and a methyl group, wherein $R_2$ is selected from the group consisting of $C_3H_5$, $C_6H_4CH_3$, $C_6H_4(CH_3)_2$ and $CnH_{2n+1}$, wherein n=1 to 30 and $R_4$ is selected from the group consisting of $C_5H_4N$, $CnH_{2n}NH_3$ and $CnH_{2n}N(CH_3)_3$, wherein n=1 to 30 and x is about 40 to about 98 mole %, more preferably about 50 to about 95 mole %, and most preferably about 80 to about 90, y is about 1 to about 50 mole %, more preferably about 2 to about 20 mole %, and most preferably about 2 to about 10 mole %, and z is about 1 to about 50 mole %, more preferably about 2 to about 20, and most preferably about 2 to about 10, wherein y and z are less than 60 mole %, and M is an amine or a metal cation selected from the group consisting of antimony, aluminum, tin, lead, Groups IA, IIA, IVA, VIA, VIIA, VIIIA, IB and IIB of the Periodic Table of Elements.

The molecular weight, as derived from intrinsic viscosities, for the terpolymers of styrene/metal styrene sulfonate/vinyl pyridine, a styrene/metal sulfoanted aliphatic amine is about $1\times10^3$ to about $5\times10^7$, more preferably about $1\times10^4$ to about $2\times10^7$ and most preferably about $1\times10^5$ to about $1\times10^7$. The means for determining the molecular weights of the oil soluble and water insoluble terpolymers is from the viscosity of solutions of the terpolymers comprises the initial isolation of the hydrocarbon soluble terpolymers, purification and redissolving the terpolymers in a nonaqueous solvent to give solutions with known concentrations. The flow times of the solutions and the pure solvent were measured in a standard Ubbelholde viscometer. Subsequently, the reduced viscosity is calculated through standard methods utilizing these values. Extrapolation to zero polymer concentration leads to the intrinsic viscosity of the polymer solution. The intrinsic viscosity is directly related to the molecular weight through the well-known Mark Houwink relationship.

The styrene/vinyl pyridine copolymer or the copolymer of styrene with the aliphatic amine ($CnH_{2n}N(CH_3)3$ or $CnH_{2n}NH_3$, wherein n=1 to 30) are formed by free radical emulsion copolymerization using techniques well-known in the polymer literature. Such polymers can be prepared by reacting the amine containing monomer (vinyl pyridine/styrene aliphatic amine or styrene), with a monomer selected form the group consisting of styrene, t-butyl styrene, alkyl acrylates, alkyl methacrylates, butadiene, isoprene vinyl chloride, acrylonitrile, acrylonitrile/butadiene/styrene monomer mixtures and copolymers, or more complex mixtures. An emulsion polymerization process is generally preferred, but other processes are also acceptable.

The vinyl pyridine content of the preferred copolymer of styrene and vinyl pyridine is about 1 to about 50 mole percent, more preferably about 2 to about 20 mole percent and most preferably about 2 to about 10 mole percent. The number average molecular weight by measured GPC is about 10,000 to about 10,000,000, preferably about 20,000 to about 5,000,000 and most preferably about 30,000 to about 2,000,000.

The amine-containing copolymer is typically a polymeric backbone where the nitrogen elements are in the chain or pendant to it. Such a polymer may be obtained by direct copolymerization of a monomer containing the basic moiety with other monomers, or by grafting a monomer containing the basic moiety on to a polymerized chain. Monomers can be chosen from vinyl monomers leading to hydrocarbon soluble polymers such as styrene, t-butyl styrene, acrylonitrile, isoprene, butadiene, acrylates, methacrylates and vinyl acetate. Monomers containing a basic moiety will be those who contain amine or alkyl amine groups or pyridine groups, such as vinyl pyridine.

The amount of vinyl pyridine or aliphatic amine in the amine-containing copolymer can vary widely, but should range form about 0.01 mole percent to about 25 mole percent.

Preferably, the amine content in the aminecontaining copolymer is expressed in terms of basic nitrogen. In this respect, the nitrogen content in amides and similar nonbasic nitrogen functionality is not part of the interacting species.

A minimum of three basic groups must be present on the average per polymer molecule and the basic nitrogen content generally will range from 4 meq. per 100 grams of polymer up to 500 meq. per 100 g. A range of 8 to 200 meq. per 100 g. is preferred.

The amine-containing copolymer of styrene and vinyl pyridine or styrene and aliphatic amine is sulfonated according to the procedure of U.S. Pat. No. 3,836,511 which is herein incorporated by reference to form the terpolymer of styrene/styrene sulfonic acid/-vinyl pyridine which is subsequently neutralized with an amine or metal cation to form the terpolymer of styrene/neutralized styrene sulfonate/vinyl pyridine.

The number of sulfonate groups contained in the terpolymer is a critical parameter affecting this invention. The number of sulfonate groups present in the polymer can be described in a variety of ways such as weight percent, mole percent, number per polymer chain, etc. For most polymer systems of interest in this invention, it is desirable to employ mole percent. An alternate way of expressing this is to state the sulfonate level in terms of milliequivalents (meq.) of sulfonic acid groups per 100 gms of polymer. This latter procedure provides a rapid and independent measure of sulfonic acid content in a polymer through simple titration.

Both mole percent sulfonate and milliequivalent of sulfonate will be employed to describe the sulfonate polymers employed in this invention.

In general, the terpolymer will comprise from about 1 meq. up to 500 meq. of sulfonate groups per 100 g. of polymer, more preferably about 5 to about 250 meq. of sulfonate groups, and most preferably about 10 to about 100. The unneutralized sulfonate terpolymers in the instant invention are neutralized with the basic materials selected from the group consisting of Groups IA, IIA, IVA, VIA, VIIA, VIIIA, IB and IIB of the Periodic Table of the Elements and lead, aluminum, tin and antimony. A preferred counterion for this invention is zinc.

Neutralization of the unneutralized sulfonated terpolymers with appropriate metal hydroxides, metal acetates, metal oxides, etc. can be conducted by means well-known in the art. For example, the sulfonation process of the copolymer containing a small 0.3 to 1.0 mole % unsaturation, can be conducted in a suitable solvent such as 1,2-dichloroethine with acetyl sulfate as the sulfonating agent. The resulting sulfonic acid derivative can then be neutralized with a number of different neutralization agents such as sodium phenolate and similar metal salts. The amounts of such neutralization agents employed will normally be stoichiometrically equal or in some excess to the amount of free acid in the polymer plus any unreacted reagent which still is present. It is preferred that the amount of neutralizing agent be equal to the molar amount of sulfonating agent originally employed plus 10% more to ensure full neutralization. The use of more of such neutralization agent is not critical. Sufficient neutralization agent is necessary to affect at least 50% neutralization of the sulfonic acid groups present in the polymer, preferably at least 90%, and most preferably essentially complete neutralization of such acid groups should be affected.

The degree of neutralization of said sulfonate groups may vary from 50 to 500 mole %, preferably 90 to 200%. It is preferred that the degree of neutralization be substantially complete, that is, with no substantial free acid present and without substantial excess of the base other than that needed to ensure neutralization. Thus, it is clear that the polymers which are utilized in the instant invention comprise substantially neutralized pendant sulfonate groups and, in fact, an excess of the neutralizing material may be utilized without defeating the objects of the instant invention.

We have surprisingly found that a very important factor in determining the strength of the interaction between the sulfonate groups amine-containing groups in the terpolymer is the nature of the counterion. There are, broadly speaking, three major classes of such counterions. The first class, which are less preferred, are those metals of Group I and Group IIA, which include Li, Na, K, etc., Be, Mg, Ca, etc. We have found that these species do not interact as strongly with amine groups as the more preferred species described below. Those metals are commonly defined as members of the transition elements (see chemical text: "Chemical Principles and Properties," by M. J. Sienko and R. A. Plane, McGraw Hill Book Co., 1974, page 19). These metal cations are best exemplified by zinc and interact strongly with pyridine and similar amines. As a consequence, a zinc neutralized sulfonate group interacts much more strongly with the vinyl pyridine in the terpolymer than does a magnesium or sodium neutralized system. It is for this reason that the transition elements are preferred with zinc, copper, iron, nickel and cobalt being especially preferred. We also include antimony, titanium, zirconium, chromium, aluminum and lead as suitable cations.

A third species which is preferred is the free sulfonic acid of the terpolymer, which will also interact with the vinyl pyridine or aliphatic amine. In this latter case, it is clear that the interaction is a classic acid-base interaction, while with the transition metals, a true coordination complex is created, which is due to the donation of the electron pair of the nitrogen element. This distinction is a very important one and sets these polyampholytes apart from classic acid-base interactions. The surprising observation is that such coordination complexes can form in such extreme dilution insofar as interacting groups are concerned, and that they are apparently formed so for removed from their expected stoichiometry, (based on small molecule analogs). Therefore, only those polymer backbones (i.e., as measured in the absence of ionic groups) having a solubility parameter less than 10.5 are suitable in this invention.

The organic liquids, which may be utilized in the instant invention, are selected with relation to the anionic and cationic moieties of the polyampholyte and vice-versa. The organic liquid is selected from the group consisting of parrifinic, napthenic and aromatic hydrocarbons, cyclic aliphatic ethers, aliphatic ethers, or organic aliphatic ethers and mixtures thereof.

DETAILED DESCRIPTION OF THE INVENTION

The following Examples illustrate the present invention without, however, limiting the same hereto.

EXAMPLE 1

A representative example for the synthesis of the sytrene-4 vinyl pyridine copolymer which is subsequently sulfonated is described below.

Into a 1 liter, 4 neck flask, was added:

50 g styrene
3.2 g sodium lauryl sulfate
120 ml distilled water
0.2 g potassium persulfate
0.05 g dodecylthiol
1.1 g 4-vinyl pyridine The solution was purged with nitrogen gas for one hour to remove dissolved oxygen. As the nitrogen gas purging began, the solution was heated to 50° C. After 24 hours, the polymer was precipitated from so'ution with a large excess of acetone. Subsequently, the polymer was washed with acetone and dried in a vacuum oven at 60° C. for 24 hours. Elemental analysis showed that the copolymer contained 2.5 mole % 4-vinyl pyridine.

EXAMPLE 2

A representative example for the sulfonation of the styrene-4 vinyl pyridine copolymer is according to the sulfonation procedure described in U.S. Pat. No. 3,836,511.

The following procedure was generally followed: 50 g. the copolymer of styrene/4-vinyl pyridine was dissolved in 500 ml of 1,2-dichloroethane. The solution was heated to 50° C., and the requisite amount of acetyl sulfate was added, in this case, 34.6 ml of 0.996M acetyl sulfate (24.5 meq.). The solution was stirred for 60 minutes at 50° C., and the reaction was terminated by the addition of 40 ml of methanol. Sufficient zinc acetate (diluted with methanol) was added to neutralize all acid present. The polymer solution was precipitated into a substantial excess of methanol with vigorous agitation, followed by filtration and washing with methanol. The product was then vacuum dried. Analyses were conducted for sulfur and sodium. The level of sulfonate incorporated was determined by sulfur analysis.

Elemental analysis shows that 1.6 mole % sulfonate groups was incorporated into the polymer chain structure.

EXAMPLE 3

The use of the polyampholyte as an oil mud viscosifier is shown in its inclusion in an OILFAZE MUD SYSTEM (Dresser Magcobar Inc.). Specifically these oil based muds were prepared using conventional laboratory methods. A typical mud was prepared by mixing 205.82 g. of No. 2 diesel oil, 34.76 g. Oil Faze (Magcobar), 1.5 g. SE-11 and 1.5 g. DV33 (Magcobar). To this mixture was added 10 g. of $CaCl_2$ in 21 ml. of water. The mud was weighed with 226.35 g. of Barite and then 4.4 g. of additional $CaCl_2$ was added. The control contained aminetreated clay at a 3 lb/bbl. treat rate. The t-butyl styrene ampholyte was added at 1 lb/bbl treat rate or 1.1 grams. The mud was then measureds into aliquots and aged at 150° F., 300° F. and 400° F. for 16 hours in pressurized mud cells. The cells were then cooled to room temp. and then rheological properties of the mud were measured on a Fann Model 35 viscometer at 115° F. All testing was performed in accordance to API Spec. 13B. The results are shown in Table I.

TABLE I

| | OIL MUD VISCOSIFIERS | | |
|---|---|---|---|
| TEMP (F.) | RHEOLOGY | BASE OIL MUD | T-BUTYLSTYRENE AMPH, 1# |
| 150 | AV | 36 | 53 |
| | PV | 23 | 32 |
| | YP | 26 | 42 |
| | ES | 580 | 580 |
| 300 | AV | 36 | 49 |
| | PV | 27 | 32 |
| | YP | 18 | 34 |
| | ES | 240 | 260 |
| | FL | 0 | 0 |
| 400 | AV | 31 | 35 |
| | PV | 26 | 27 |
| | YP | 10 | 16 |
| | ES | 120 | 240 |
| | FL | 0.2 | 2.7 |

What is claimed is:

1. An oil-based drilling mud which comprises:

(a) a hydrocarbon liquid substantially immiscible in water;
(b) about 1 to about 100 parts by weight of water per 100 parts of the hydrocarbon liquid;
(c) about 2 to about 50 lb/bbl. of at least one emulsifier;
(d) about 0.5 to about 5 lb/bbl. of a wetting agent;
(e) about 50 to about 750 lb/bbl. of a weight agent;
(f) about 0.1 to about 25 lb/bbl. of a water insoluble, oil soluble terpolymer, said terpolymer having the formula:

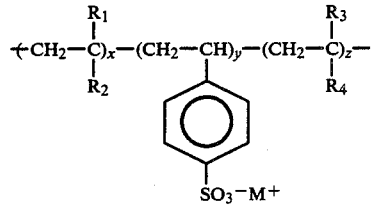

wherein $R_1$ and $R_3$ are selected from the group consisting of hydrogen and a methyl group, wherein $R_2$ is $C_6H_4CH_3$ and $R_4$ is selected from the group consisting of $C_5H_4N$, $CnH_{2n}NH_3$ and $CnH_{2n}N(CH_3)_3$, wherein n=1 to 30 and x is about 40 to about 98 mole percent, y is about 1 to about 50 mole percent, and z is about 1 to about 50 mole percnet, wherein y and z are less than 60 mole percent, and M is an amine or a metal cation selected from the group consisting of aluminum, iron, lead, Groups IA, IIA, IVA, VIA, VIIA, VIIIA, IB and IIB of the Periodic Table of Elements.

2. A drilling mud according to claim 1 wherein said wetting agent is alkylaryl sulfonate.

3. A drilling mud according to claim 1 wherein said weighting material is barite or barium sulfate.

4. A drilling mud according to claim 1 wherein said weighting material is synthetic or naturally occurring iron oxides.

5. A drilling mud according to claim 1 wherein the concentration level of said weighting material is sufficient to give said drilling mud a specific gravity of about 7 pounds per gallon to about 20 pounds per gallon.

6. A drilling mud according to claim 1 wherein said hydrocarbon liquid is an oil.

7. A drilling mud according to claim 1 wherein said emulsifier is a magnesium or calcium soap of a fatty acid.

8. A drilling mud according to claim 1 which further includes a polar cosolvent.

9. A drilling mud according to claim 1 wherein said water is brine.

10. A drilling mud according to claim 1 wherein the concentration of said water is about 3 to about 35 parts by weight per 100 parts by weight of said hydrocarbon liquid.

* * * * *